United States Patent
Kim

(10) Patent No.: US 6,205,284 B1
(45) Date of Patent: Mar. 20, 2001

(54) RESERVED RECORDING METHOD FOR BROADCASTING PROGRAMS

(75) Inventor: Jin Hwi Kim, Suwon (KR)

(73) Assignee: Samsung Electronics Co., Ltd., Kyungki-Do (KR)

( * ) Notice: Subject to any disclaimer, the term of this patent is extended or adjusted under 35 U.S.C. 154(b) by 0 days.

(21) Appl. No.: 08/969,675

(22) Filed: Nov. 13, 1997

(30) Foreign Application Priority Data

Nov. 13, 1996 (KR) .................................................. 96-53800

(51) Int. Cl.$^7$ ............................. H04N 5/761; H04N 5/76
(52) U.S. Cl. ................................................. 386/83; 386/46
(58) Field of Search ........................... 386/83, 46, 52–92, 386/4, 95; 360/32; 348/7, 12

(56) References Cited

U.S. PATENT DOCUMENTS

| | | | |
|---|---|---|---|
| 4,488,179 | 12/1984 | Kruger et al. ........................ | 358/181 |
| 4,879,611 | * 11/1989 | Fukui et al. ............................ | 386/83 |
| 5,390,027 | * 2/1995 | Henmi et al. ............................ | 386/83 |

FOREIGN PATENT DOCUMENTS

| | | | |
|---|---|---|---|
| 0 724 360 | 7/1996 | (EP) ............................... | H04N/5/782 |
| 2 126 002 | 3/1984 | (GB) ............................... | G11B/15/02 |

OTHER PUBLICATIONS

Patent Abstracts of Japan, vol. 13, No. 439 (E–827), Oct. 3, 1989 & JP 01 168173 A (Fuji Electric) Jul. 3, 1989 *Abstract.

Patent Abstracts of Japan, vol. 15, No. 165 (E–1061), Apr. 25, 1991 & JP 03 034630 A (Sanyo Electric) Feb. 14, 1991 *Abstract.

* cited by examiner

Primary Examiner—Robert Chevalier
(74) Attorney, Agent, or Firm—Sughrue, Mion, Zinn, Macpeak & Seas, PLLC

(57) ABSTRACT

This method form performing reserved recording of broadcasting programs in a VCR provides for starting of recording accurately at the beginning of each recording-reserved broadcasting program. The reserved recording method extracts the program identification information, such as a VPS or a KBPS, in the received broadcasting signal of a broadcasting program. Based on a comparison of the program identification information, a judgement is made whether recording execution should be started. All recording reservation data of the same channel are compared at once. The order of precedence in which channels are selected for comparison of their corresponding recording reservation data with the program identification information is based on the order of the programmed start times of the various recording reservation data. This method decreases the amount of time spent comparing program identification data to the recording reservation data at the start of recording execution. Thus, a delay time for recording execution start of a reserved broadcasting program can be reduced to thereby enable a recording execution of the reserved program to start on time.

8 Claims, 4 Drawing Sheets

FIG. 2

```
**  TIME SET  **
1996/09/06 FRI 10:00

MENU : SETTING END
```

FIG. 3

```
1  06  09/06  10:00 - 10:30  VPS
2  06  09/06  12:00 - 12:30  VPS
3  09  09/06  18:20 - 18:40  VPS
4  11  09/06  21:00 - 21:30  VPS
5  06  09/07  10:00 - 11:00  VPS
6  06  09/07  12:00 - 12:30  VPS
7  09  09/07  18:20 - 18:40  VPS
8  06  09/06  11:00 - 11:30  VPS
```

RESERVED RECORDING METHOD FOR BROADCASTING PROGRAMS

BACKGROUND OF THE INVENTION

1. Field of the Invention

The present invention relates to a reserved recording method for broadcasting programs capable of enabling accurate reserved recording to be executed by reducing a start delay time when recording a reserved broadcasting program using program identification information transmitted from each broadcasting station.

2. Background Art

General broadcasting programs are ideally broadcast at their scheduled times, but often are actually broadcast at unscheduled times ahead of or behind the scheduled times. As a result, when a reserved recording is performed in a video cassette recorder (VCR) or television incorporated with a VCR (TVCR), broadcasting programs which the user does not desire may be recorded during a reserved recording time. Thus, each broadcasting station transmits, in an actual broadcasting time of a broadcasting program, a broadcasting signal together with program identification information representing a regular broadcasting date and time with respect to the broadcasting program based on a predefined data format which is preset among broadcasting stations.

The VCR or TVCR has a function capable of executing a reserved recording according to an actual broadcasting time by continuously checking whether a recording execution has been performed with respect to reserved broadcasting programs, using the received program identification information. The above function is called a video programming system (VPS) in the European broadcasting system and is called a Korea broadcasting program system (KBPS) in the Korean broadcasting system.

According to the VPS, program identification information about a program is overlapped on the 16th horizontal line contained in a vertical blanking section of a broadcasting signal. As a result, a receiving end can record a desired broadcasting program based on the information.

FIG. 1 is a block diagram of a conventional reserved recording apparatus using the VPS. The FIG. 1 apparatus includes a key input unit 11 for setting recording reservation data for reserved recording of broadcasting programs. A controller 12 performs reservation of recording of broadcasting programs according to a key input signal input from the key input unit 11, and controls the whole operation of each of the other blocks to perform a recording of the reserved broadcasting programs. The FIG. 1 apparatus includes a display 13 for displaying a menu picture serving to perform a recording reservation under the control of the controller 12, and a storage unit 16 for storing the set recording reservation data. A tuner 14 selects a channel corresponding to recording reservation data and supplies a broadcasting signal of the selected channel to a data extractor 15. The data extractor 15 extracts VPS data from the broadcasting signal supplied from the tuner 14. Also, the FIG. 1 apparatus includes a deck 17 which executes a recording with respect to the broadcasting program selected via the tuner 14 when the recording reservation data stored in the storage unit 16 corresponds to the VPS data extracted from the data extractor 15. The operation of the FIG. 1 apparatus having the above structure will be described below with reference to FIGS. 2 and 3 to show a conventional method of operation.

When a user applies a key input signal for recording reservation of broadcasting programs via the key input unit 11, the controller 12 receives the key input signal and displays, on the display 13, a menu picture for setting a recording time as shown in FIG. 2. The user watches the picture of FIG. 2 and sets a recording date, a day of the week and a time via the key input unit 11. Also, the channel of a desired broadcasting program is set and a VPS function is set. The user can reserve recording of a plurality of broadcasting programs, up to a maximum of eight broadcasting programs, as shown in FIG. 3.

If the VPS function is not set, recording with respect to the reserved broadcasting program starts and ends on the set date and time. On the other hand, if the VPS function is set, VPS data transmitted at the actual broadcasting time of a program by the broadcasting station is used for a reserved recording of the broadcasting program corresponding to the transmitted VPS data.

The controller 12 receiving the key input signal via the key input unit 11 stores, in the storage unit 16, the recording reservation data including a channel number, date and time of the broadcasting program to be recording-reserved. The controller 12 uses reservation data stored in the storage unit 16 in set sequence of the reservation data to check whether recording has been performed. More specifically, the controller 12 controls the tuner 14 to select a channel according to the channel number of the recording reservation data to be set first. A broadcasting signal of the selected channel is input to the data extractor 15. The data extractor 15 extracts the VPS data contained in the broadcasting signal supplied from the tuner 14, and the extracted VPS data is input to the controller 12. The controller 12 compares the VPS data extracted by the data extractor 15 with the recording reservation data used in the channel selection. That is, the controller 12 compares the broadcasting date and time contained in the VPS data supplied from the data extractor 15 with the reserved recording date and time contained in the recording reservation data. The controller 12 judges whether a recording is performed based on the comparison result. When eight broadcasting programs are recording-reserved as shown in FIG. 3, the controller 12 uses recording reservation data in set sequence from a number one to a number eight to select a broadcasting signal of a corresponding channel, extracts VPS data from a broadcasting signal of the selected channel, and judges whether a recording is performed.

If the judgement by using the eighth set of recording reservation data is completed, such a judgement is repeated beginning with the first set of recording reservation data. When VPS data and recording reservation data are the same, the controller 12 controls the deck 17 to perform a recording. The controller 12 stops a recording using the recording reservation data when the extracted VPS data differs from the recording reservation data during the recording, otherwise it continues the recording.

In the case of the conventional operating method described above, in order to perform a recording of a recording-reserved broadcasting program, a broadcasting signal corresponding to the channel of a recording-reserved broadcasting program is selected and then the VPS data is extracted from the selected broadcasting signal. Also, the extracted VPS data is compared with the set recording reservation data, and a recording is performed if the former is same as the latter by a predetermined number of times (here, at least three times), while the above procedure is executed in order to perform a recording of a broadcasting program corresponding to different recording reservation data. This process consumes four seconds or more. Thus, if eight broadcasting programs are recording-reserved at maximum, a recording execution start can be delayed by 32 seconds or more, which prevents an accurate recording start time with respect to a reserved program.

SUMMARY OF THE INVENTION

To solve the above problems, it is an object of the present invention to provide a reserved recording method of a broadcasting program which performs a reserved recording by extracting program identification information of each broadcasting station so that a more accurate reserved recording is performed, applying the extracted program identification information to recording reservation data having an identical channel, and judging whether a reserved recording is being received.

To accomplish the above object of the present invention, there is provided a reserved recording method of a broadcasting program, the method comprising the steps of:

(a) setting recording reservation data for recording reservation of broadcasting programs;

(b) determining priority with respect to a number of recording reservation data set in step (a);

(c) selecting a channel corresponding to the recording reservation data having the earliest priority and extracting program identification information contained in a broadcasting program of the selected channel;

(d) comparing all the recording reservation data corresponding to the channel used for selection in step (c) with the extracted program identification information, and judging whether the recording reservation data corresponding to the program identification information exists;

(e) starting a recording of a broadcasting program using the recording reservation data when the recording reservation data corresponding to the program identification information exists in step (d); and (f) performing step (c) and following steps based on the recording reservation data having the earliest priority among the recording reservation data corresponding to the remaining channels which are not used for selection when the recording reservation data corresponding to the program identification information does not exist in step (d).

BRIEF DESCRIPTION OF THE DRAWINGS

The preferred embodiment is described with reference to the drawings wherein:

FIG. 2 shows a screen for setting a reserved recording time displayed on a display of the FIG. 1 apparatus;

FIG. 3 shows recording-reserved data stored in a storage unit of the FIG. 1 apparatus.

DETAILED DESCRIPTION OF THE PREFERRED EMBODIMENT

A preferred embodiment of the present invention will be described in detail with reference to the accompanying drawings.

Figure 1:
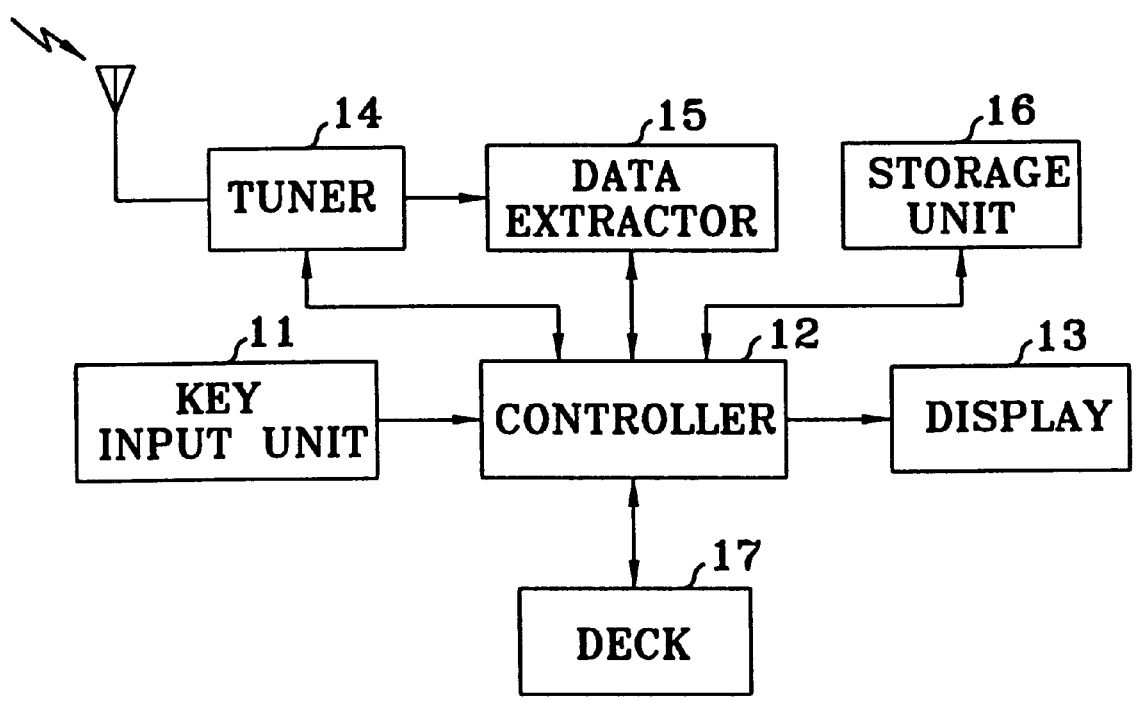
FIG. 1 is a block diagram showing a general reserved recording apparatus using a VPS.

A reserved recording method for a broadcasting program according to the present invention can be embodied by the FIG. 1 general apparatus having a controller 12 which implements the method of the present invention. Thus, the controller according to the present invention uses the same reference numeral 12 although it has been modified from the controller 12 of the FIG. 1 apparatus.

Figure 4A:
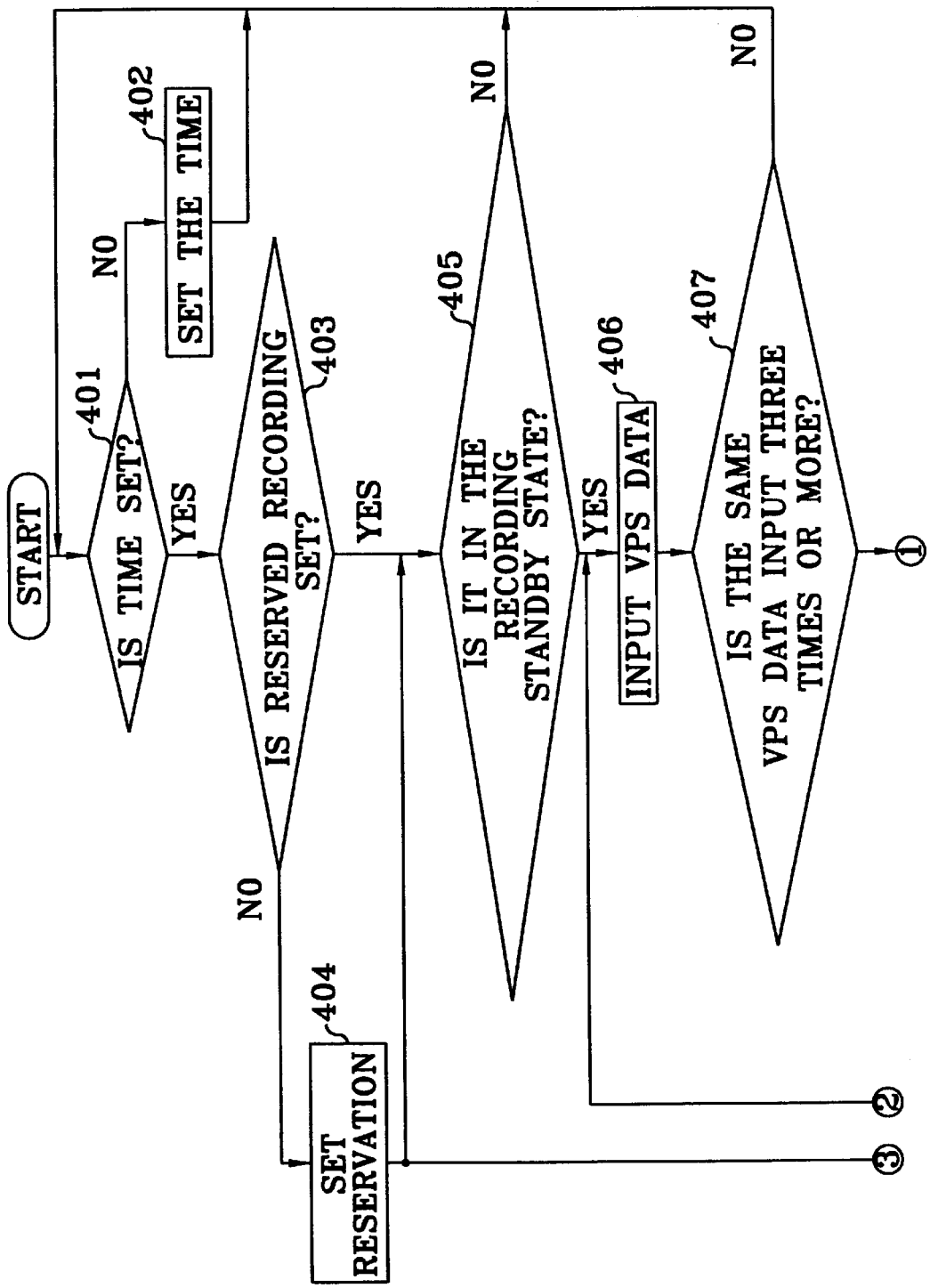
FIGS. 4A and 4B show a flow-chart diagram for explaining a reserved recording method of a broadcasting program according to the present invention.
Figure 4:
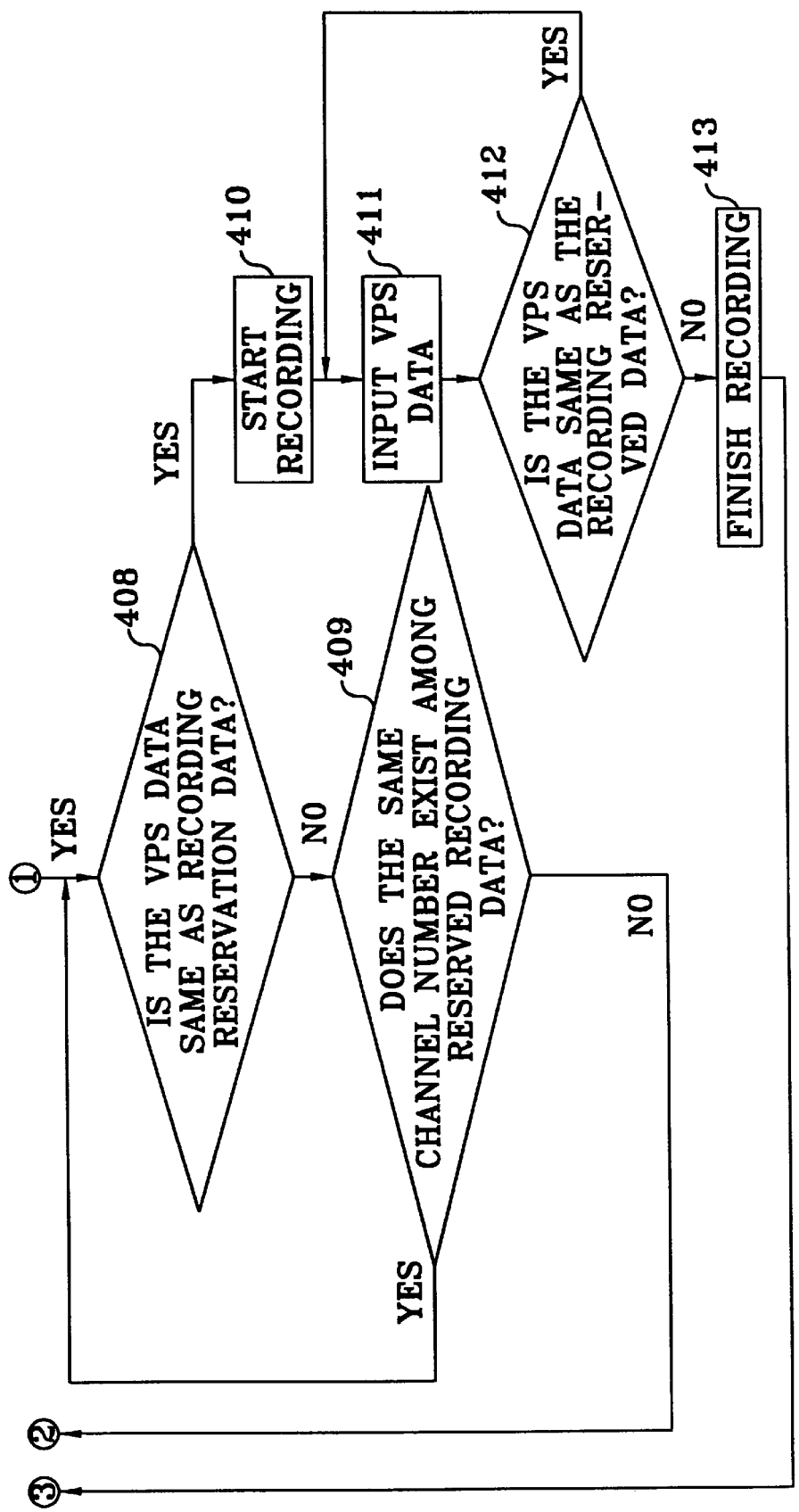

Refer to FIGS. 4A and 4B showing flow-chart diagrams for an explanation of the method for reserved recording of a broadcasting program according to a preferred embodiment of the present invention. At the state where a set of a VCR or a TVCR is turned 'on' under the circumstance when a normal broadcasting signal is input, a user selects recording reservation via a key input unit 11. When recording reservation is selected via the key input unit 11, the controller 12 checks whether a current time is set (step 401). The controller displays a menu picture serving to set a current time on the display 13, when the current time is not set in the in step 401. The user watches the picture displayed on the display 13 and inputs the current time via the key input unit 11. The controller 12 sets the current time input via the key input unit 1:1 in the set (step 402), and then performs step 401.

When the current time has been set in the set in step 401, the controller 12 checks whether a broadcasting program to be recorded is reserved in step 403. If the broadcasting program to be recorded has not been reserved in step 403, the controller 12 controls the display 13 to display a picture serving to set reservation of a broadcasting program to be recorded. The user watches the picture displayed on the display 13, inputs the data such as a channel number, date, and time of the broadcasting program to be reservation-recorded via the key input unit 11, and selects the VPS via the key input unit 11. The controller 12 stores the recording reservation data including a channel number, date, and time of the broadcasting program input via the key input unit 11 in the storage unit 16, to then set the reservation recording using the VPS (step 404) and then performs step 405.

The user determines the order of priority with respect to recording reservation data in the case where a number of recording reservation data are set. The priority order with respect to the number of the recording reservation data is determined to match a set sequence of the recording reservation data or a sequence of the recording data and time contained in the recording reservation data.

If the reserved recording has been set in step 403, the controller 12 checks whether the power is turned off in a recording stand-by state (step 405). If the apparatus is not in the recording stand-by state in step 405, the controller 12 returns to the initial state and then performs step 401. If the apparatus is in the recording stand-by state in step 405, the controller 12 controls the tuner 14 to select the broadcasting signal according to the channel number of the recording reservation data having the foremost priority among the recording reservation data stored in the storage unit 16. The data extractor 15 receives the broadcasting signal selected via the tuner 14 and extracts a VPS data contained in the broadcasting signal. The controller 12 receives the VPS data from the data extractor 15 (step 406). The controller 12 confirms whether the VPS data is input for a predetermined number of times in preparation for a case that the input VPS data is noise (step 407).

In this embodiment, the predetermined number of times is set as three times or more. If the same VPS data is not input three times or more in step 407, the controller 12 returns to the initial state and performs step 401. If the same VPS data is input three times or more, the controller 12 stores the VPS data in the storage unit 16. Then, the controller 12 compares the stored VPS data with the recording reservation data which is used for the channel selection, to check whether both data are the same (step 408). When both data are not the same in step 408, the controller 12 checks whether different recording reservation data having the channel number used for channel selection among the recording reservation data stored in the storage unit 16 exists (step 409). If recording reservation data having the same channel number does not exist in step 409, the controller 12 selects recording reservation data having foremost priority among the recording reservation data which have channel number different from that used for the channel selection, and performs the step 406 and the subsequent steps which follow therefrom. Step 406 receives the VPS data contained in the broadcasting signal of the channel corresponding to the recording reservation data having the priority. When the same channel number exists in step 409, the controller 12 uses the VPS data stored in the storage unit 16 without additional extraction of the VPS data, to perform the steps following from step 408, so as to compare the VPS data with the recording reservation data to check whether both are the same.

It both the data are same in step 408, the controller 12 drives the deck 17 and starts the recording (step 410). The controller 12 receives the VPS data extracted from the broadcasting signal selected via the tuner 14 even during recording (step 411). The controller 12 judges whether the input VPS data is the same as the recording reservation data used in current recording (step 412). If both the data are the same in step 412, the controller 12 performs step 411 while continuing execution of the recording. If both the data are not same in step 412, the controller 12 finishes the recording (step 413), and performs the steps following from step 405.

For example, in the case when the current time is 11:00 after the recording reservation data has been set, as shown in FIG. 3, the conventional method takes about 32 seconds (i.e., 4×8 seconds) to judge a recording execution start of a broadcasting program corresponding to the recording reservation data having the priority of "8". On the contrary, the method according to the present invention selects a broadcasting signal corresponding to a channel number of the broadcasting program of the foremost priority, and compares the VPS data in the broadcasting signal with all the recording reservation data having the same channel number being used for the channel selection, to thereby judge whether a recording execution start is made. Thus, reserved recording execution is judged at the same time with respect to the priorities 1, 2, 5, 6 and 8. As a result, it takes about only four seconds to judge the reserved recording execution start of the priority 8, which reduces a start delay time a great deal.

As described above, the reserved recording method for a broadcasting program according to the present invention selects a channel of a broadcasting signal of a recording-reserved program in sequence of the designated priority when a reserved recording is performed using the program identification information such as a VPS or a KBPS, and compares the program identification information extracted from the select broadcasting signal with the recording reservation data having the channel number used for the selection, to thereby judge the reserved recording execution start. This provides an effect of reducing a delay time of the reserved recording execution start.

Although the present invention has been described above in terms of a preferred embodiment, it will be apparent that numerous modifications may be made to the described embodiment without departing from the spirit and scope of the invention.

What is claimed is:

1. A method for performing reserved recording of broadcasting programs, the method comprising (a) a various setting recording reservation data for recording reservation of the broadcasting programs;

(b) determining relative priority between the various recording reservation data, corresponding to each of the broadcasting programs;

(c) selecting a channel corresponding to a recording reservation data having an earliest priority among the various recording reservation data;

(d) extracting program identification information contained in a broadcasting program received via the channel selected in the selecting operation (c);

(e) comparing all the recording reservation data which correspond to the channel selected in the selecting operation (c) with the program identification information extracted in the extracting operation (d), and judging whether the recording reservation data corresponding to the program identification information exists;

(f) starting a recording of a broadcasting program using the recording reservation data, when the recording reservation data corresponding to the program identification information exists in the comparing operation (e); and (g) performing (c) through (f) repeatedly based on the recording reservation data having the earliest priority among the various recording reservation data corresponding to the remaining channels which have not already been used for selection, when the recording reservation data corresponding to the program identification information does not exist in (e).

2. The method for performing reserved recording of broadcasting programs according to claim 1, wherein the relative priority between various recording reservation data is set to be consistent with the setting sequence of the recording reservation data.

3. The method for performing reserved recording of broadcasting programs according to claim 1, wherein said each recording reservation data includes channel number, recording date, time, and a relative priority with respect to the various recording reservation data, the relative priority being set to be consistent with the sequence of the recording date and time contained in the various recording reservation data.

4. The method for performing reserved recording of broadcasting programs according to claim 3, wherein said program identification information contains recording date and time information which are the same as the recording date and time contained in recording reservation data corresponding to the broadcasting program containing the program identification information.

5. The method for performing reserved recording of broadcasting programs according to claim 3, wherein (c)–(f) are performed based on the priority determined by the operation of (b), in the case when the recording reservation data corresponding to the program identification information with respect to all channels allowed by the recording reservation data does not exist.

6. The method for performing reserved recording of broadcasting programs according to claim 1, wherein the operation of (e) further comprises (e1) checking whether the program identification information is extracted a predetermined number of times or more in the operation of (c) in order to obtain accurate program identification information; and (e2) storing the program identification information extracted in the operation of (c) in order to compare the extracted program identification information with the recording reservation data of the next priority having the channel used for selection, if the program identification information has been extracted a predetermined number of times in the checking result of the operation of (e1).

7. The method for performing reserved recording of broadcasting programs according to claim 1, further comprising:
(h) continuously comparing the various recording reservation data used for recording with the program identification information contained in the broadcasting program to be recorded during the recording execution, and judging whether a recording execution started during the operation of (f) is to be finished based on the comparison result.

8. The method for performing reserved recording of broadcasting programs according to claim 7, wherein the operation (h) continuously performs a recording execution when the recording reservation data used for recording corresponds to the program identification information of the broadcasting program during recording, and finishes a recording execution when the recording reservation data used for recording does not correspond to the program identification information of the broadcasting program during recording.

* * * * *